United States Patent
Kobayashi et al.

(10) Patent No.: US 6,796,754 B2
(45) Date of Patent: Sep. 28, 2004

(54) CHIP COLLECTING APPARATUS FOR TIP DRESSER

(75) Inventors: Hirokatsu Kobayashi, Tokyo (JP); Kiyotaka Shibata, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 16 days.

(21) Appl. No.: 10/183,951

(22) Filed: Jun. 25, 2002

(65) Prior Publication Data

US 2003/0002944 A1 Jan. 2, 2003

(30) Foreign Application Priority Data

Jun. 27, 2001 (JP) ........................................ 2001-195084

(51) Int. Cl.⁷ ............................. B23C 3/00; B23C 11/02; B23C 11/08
(52) U.S. Cl. ........................................ 409/137; 409/140
(58) Field of Search ................................ 409/140, 137, 409/138–139, 134; 451/453; 144/252.1, 252.2; 82/901; 408/16

(56) References Cited

U.S. PATENT DOCUMENTS

| | | | | |
|---|---|---|---|---|
| 4,514,936 A | * | 5/1985 | Hurtado | 409/137 |
| 4,896,014 A | * | 1/1990 | Sakai et al. | 219/91.2 |
| 5,237,896 A | * | 8/1993 | Albright et al. | 409/137 |
| 5,470,182 A | * | 11/1995 | Krupotich et al. | 409/137 |
| 5,951,219 A | * | 9/1999 | Stadtfeld et al. | 409/137 |
| 6,042,311 A | * | 3/2000 | Yokoyama et al. | 409/138 |
| 6,106,203 A | * | 8/2000 | Asmis et al. | 409/137 |
| 6,210,457 B1 | * | 4/2001 | Siemers | 55/429 |
| 6,666,631 B2 | * | 12/2003 | Yajima et al. | 409/137 |
| 2002/0044847 A1 | * | 4/2002 | Yajima et al. | 409/140 |
| 2003/0002945 A1 | * | 1/2003 | Sunaga et al. | 409/140 |

FOREIGN PATENT DOCUMENTS

| | | | |
|---|---|---|---|
| DE | 019825771 A1 | * | 12/1999 |
| EP | 001186369 A1 | * | 3/2002 |
| JP | 59-127979 A | * | 7/1984 |
| JP | 4-17983 A | * | 1/1992 |
| JP | 6-122082 | | 5/1994 |
| JP | 2003-1435 A | * | 1/2003 |
| JP | 2003-80374 A | * | 3/2003 |

* cited by examiner

Primary Examiner—Erica Cadugan
(74) Attorney, Agent, or Firm—Darby & Darby

(57) ABSTRACT

In a chip collecting apparatus for a tip dresser of the present invention, the outer periphery of a dressing body is covered with a chip pickup case for taking hold of chips generated while electrode tips are dressed. A chip discharge port provided at the bottom of the chip pickup case is normally closed with a lid. The chips generated during the dressing operation accumulate on the bottom of the chip pickup case. When collecting the chips, an operator carries a chip collection vessel, opens the lid of the chip pickup case, and collects the dropped chips into the chip collection vessel. Even when a plurality of chip dressers is mounted, the chips can be collected together into the one chip collection vessel.

3 Claims, 4 Drawing Sheets

CHIP COLLECTING APPARATUS FOR TIP DRESSER

BACKGROUND OF THE INVENTION

1. Field of the Invention

The present invention relates to a chip collecting apparatus for a tip dresser for collecting chips generated when dressing electrode tips.

2. Description of the Related Art

Conventionally, electrode tips used for spot welding or the like are worn out (or deformed) when welding work is repeated. When welding work is performed with a worn-out electrode tip, welding of desired quality cannot be obtained; accordingly, electrode tips are periodically dressed to maintain welding quality.

For example, Japanese Unexamined Patent Application Publication No. 6-122082 discloses a technology for dressing electrode tips in which after the upper and lower surfaces of a dressing body have been tightly pressed by a pair of electrode tips provided at opposed ends of a welding gun, and the welding gun is swung around the central axis of each electrode tip for grinding, thereby dressing the electrode tips.

Generally, copper is often employed for an electrode tip used for spot welding and the like. In order to maintain proper welding quality, as the frequency of grinding is increased, the amount of ground or polished chips of the electrode tip is increased. Accordingly, it is necessary to increase the collection rate of the chips and to effectively recycle them in order to reduce material cost. For this purpose, a chip collection vessel is disposed below a dressing body for collecting chips.

However, it is difficult to efficiently collect all the chips only by disposing the chip collection vessel below the dressing body.

Also, a large number of chip collection vessels are required in order to individually provide the chip collection vessel for each chip dresser. Therefore, material cost increases, which leads to an increase in cost.

Furthermore, when the chips gathered in the chip collection vessel are individually collected in parallel with dressing operation for the electrode tips by the tip dresser, the chips are dropping into the chip collection vessel. Therefore, the chips cannot be collected from the chip collection vessel at that time, thus decreasing productivity.

SUMMARY OF THE INVENTION

Accordingly, it is an object of the present invention to provide a chip collecting apparatus for a tip dresser in which the collection rate of chips generated when electrode tips are dressed by polishing or grinding operation can be increased and therefore the rate of recycling can be improved, and also, there is no need to individually dispose a chip collection vessel, thus reducing material cost correspondingly; moreover, the chips can be efficiently collected.

In the chip collecting apparatus for a tip dresser according to the present invention including a tip dresser for dressing the electrode tips by sandwiching and pressurizing both sides of a dressing body with a pair of opposite electrode tips and relatively sliding the dressing body and the pair of electrode tips, a chip discharge port is provided at the bottom of a chip pickup case, which covers the dressing body held in the dresser main body, and the chip discharge port is closed by an openable lid.

With such a configuration, the chip discharge port provided at the bottom of the chip pickup case is normally closed by the lid and the chips generated during dressing operation is deposited at the lower part of the chip pickup case. Then, the lid is opened when the chips are collected and the chips deposited in the chip pickup case is discharged and collected through the chip discharge port.

The above and other objects, features and advantages of the invention will become more clearly understood from the following description referring to the accompanying drawings.

BRIEF DESCRIPTION OF THE DRAWINGS

FIGS. 1 and 2 show a chip collecting apparatus according to a first embodiment of the present invention, wherein:

FIG. 1 is a front view of the chip collecting apparatus for a tip dresser; and

FIG. 2 is a sectional side view of the chip collecting apparatus for the tip dresser;

DETAILED DESCRIPTION OF THE PREFERRED EMBODIMENTS

Figure 1:
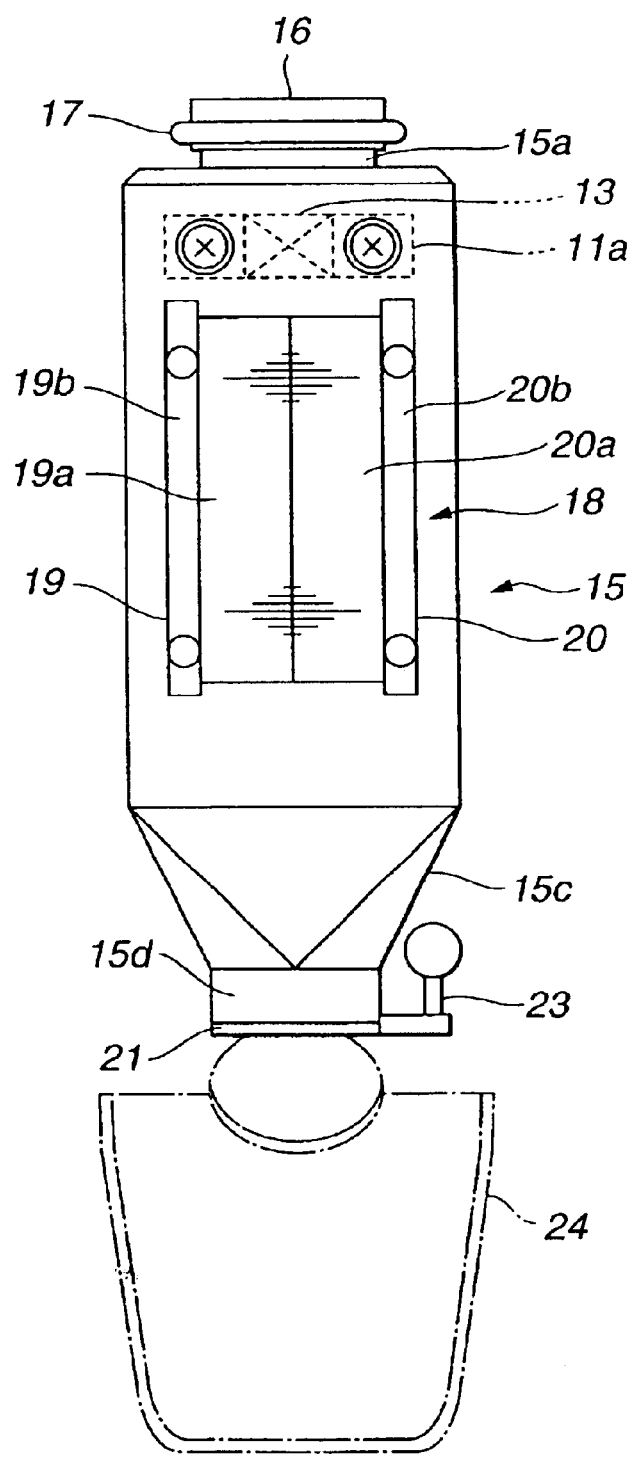

Referring to the drawings, embodiments of the present invention will be described.

Figure 2:
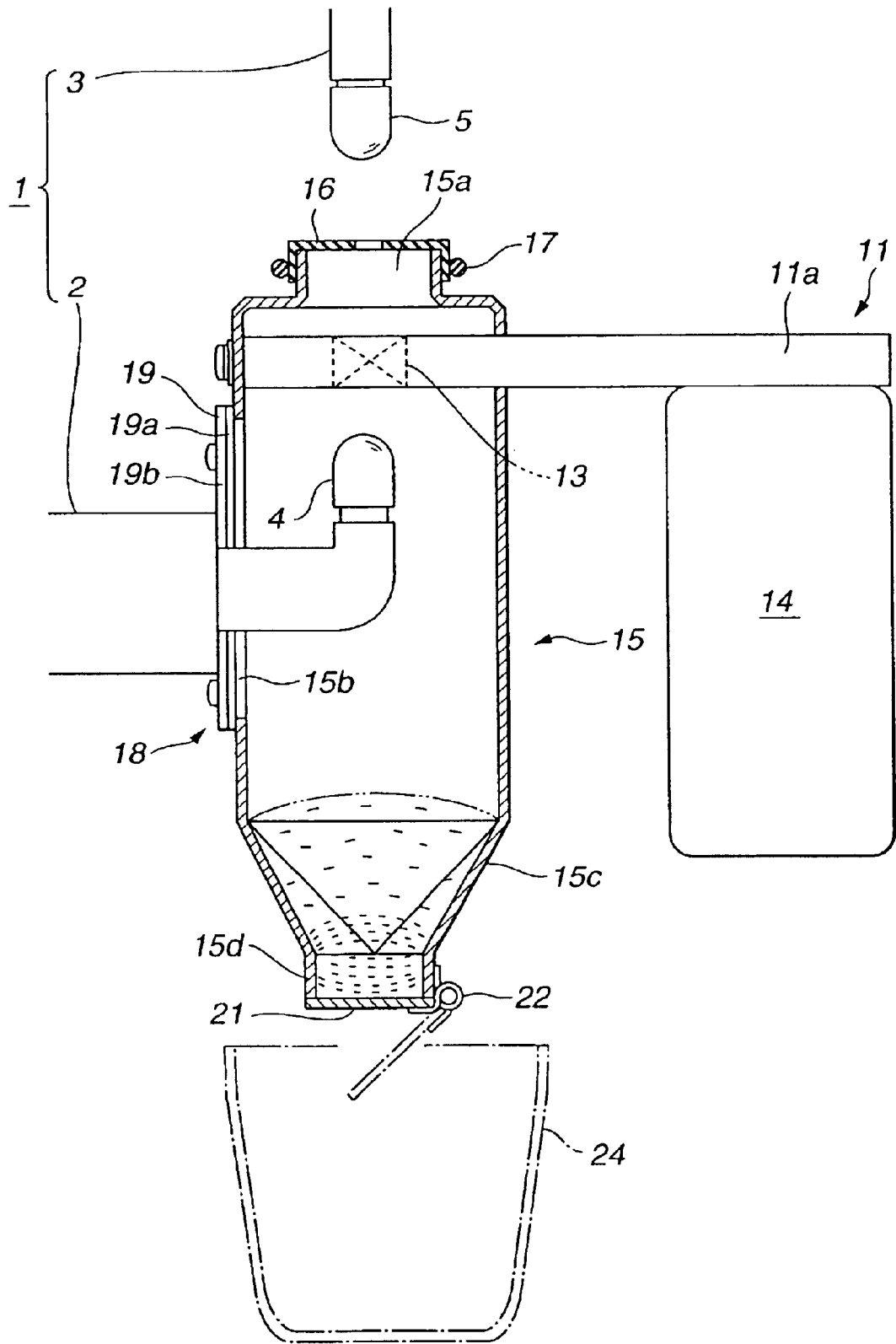

FIGS. 1 and 2 show a first embodiment of the invention.

A welding gun 1 is connected to a welding robot. The welding gun 1 has first and second gun arms 2 and 3, to the ends of which electrode tips 4 and 5 are detachably attached to face each other. The electrode tips 4 and 5 are coaxially disposed and are relatively brought into close proximity to and apart from each other by advancing and retracting motions of at least one of the gun arms 2 and 3.

A tip dresser 11 for dressing the ends of the electrode tips 4 and 5 is disposed at a position not to interfere with welding work in the range of operation of the welding robot.

A dressing body 13 is rotatably supported at the end of a dresser main body 11a extending laterally from the tip dresser 11. The dressing body 13 is driven to rotate by a motor 14 hung from the dresser main body 11a, and has concave cutters (not shown) on both sides thereof (the upper and lower surfaces in the drawing), the cutters being capable of dressing the ends of the electrode tips 4 and 5 into a predetermined shape by polishing or grinding operation.

The dresser main body 11a has a chip pickup case 15 at the end thereof. The chip pickup case 15 is a mold made of nonferrous metal or resin or is formed by working a thin steel sheet, and has an upper tip insertion port 15a allowing the insertion of the electrode tip 5 opened on the top and on the axis of the dressing body 13, and a front tip insertion port 15b allowing the insertion of the electrode tip 4 opened at the front. Moreover, a tapered chip guide surface 15c converging downward is formed under the chip pickup case 15, and a chip discharge port 15d is formed at the lower end of the chip guide surface 15c.

A cap-shaped elastic shielding member 16 made of rubber or the like is attached onto the upper tip insertion port 15a formed on the top of the chip pickup case 15, the outer periphery of which is fastened with a ring-shaped clip 17. The shielding member 16 has, for example, a small-diameter hole at the center, from which slits are formed radially in the direction of the rim, and allows the penetration of the electrode tip 5 from nearly the center by elastic deformation.

Also, a shielding member 18 is disposed at the front tip insertion port 15b. The shielding member 18 is composed of a pair of brush sections 19 and 20 arranged to face each other on the right and left sides of the front tip insertion port 15b. The bases of brushes 19a and 20a made of nylon or the like and provided at the brush sections 19 and 20, respectively, are screwed to the rim of the front tip insertion port 15b with plates 19b and 20b.

The ends of the brushes 19a and 20a of the brush sections 19 and 20 are brought into contact with each other at approximately the center of the front tip insertion port 15b to block the front tip insertion port 15b. Since the shielding member 18 is provided to prevent chips generated while the electrode tips 4 and 5 are dressed from flying off to the exterior through the front tip insertion port 15b, airtightness is not required.

A chip discharge port 15d formed at the bottom of the chip pickup case 15 is closed with an openable lid 21. One end of the lid 21 is rotatably supported on the outer side of the chip discharge port 15d with a hinge 22, and is normally pushed in a direction to close the chip discharge port 15d by a spring force of a return spring (not shown). Also, an operating lever 23 is connected to the lid 21, so that an operator can open the lid 21 as necessary by swinging the operating lever 23.

Reference numeral 24 denotes a chip collection vessel. An operator carries the chip collection vessel 24 when making the rounds of a plurality of chip dressers for collecting chips accumulating in the chip pickup case 15 provided to each chip dresser 11 and collects the chips together into the chip collection vessel 24.

Subsequently, the operation of this embodiment with such a configuration will be discussed. When spot welding work using a welding robot has been completed in a predetermined way, and then the ends of the electrode tips 4 and 5 are dressed, the welding robot is operated in accordance with preset teaching to bring the first and second gun arms 2 and 3 provided to the welding gun 1 close to the dresser main body 11a with a predetermined space being left therebetween.

The gun arms 2 and 3 are brought into the vicinity of the front of the chip pickup case 15; the first gun arm 2 is advanced to the chip pickup case 15 through the brushes 19a and 20a; and the second gun arm 3 is positioned at the above of the chip pickup case 15.

When the first gun arm 2 passes through the brushes 19a and 20a, the brushes 19a and 20a are elastically deformed along the outside shape of the first gun arm 2 and closes the periphery of the first gun arm 2.

Then, the central axis of the electrode tip 4 mounted at the end of the first gun arm 2 is arranged onto the central axis of the dressing body 13 held in the dresser main body 11a. At this time, since the electrode tip 4 and the electrode tip 5 mounted at the end of the second gun arm 3 are arranged on the same axis, the electrode tip 5 is also arranged on the central axis of the dressing body 13. Subsequently, at least one of the gun arms 2 and 3 is moved to bring the electrode tips 4 and 5 relatively close to each other.

Then, the electrode tip 5 mounted at the end of the second gun arm 3 penetrates the shielding member 16 from the above of the dresser main body 11a and comes close to the upper surface of the dressing body 13. When the second gun arm 3 penetrates the shielding member 16, the shielding member 16 is elastically deformed along the outside shape of the second gun arm 3 and closes the periphery of the second gun arm 3.

When the electrode tips 4 and 5 are further brought close to each other, they are brought into contact with the cutters (not shown) provided on both sides of the dressing body 13, and sandwich the dressing body 13 under pressure. At this time, since the dressing body 13 is driven to rotate by the motor 14 provided to the dresser main body 11a, the ends of the electrode tips 4 and 5 are dressed by polishing or grinding operation with the cutters.

Chips generated during the dressing operation of the electrode tips 4 and 5 are dropped into the chip pickup case 15. At this time, since the chip discharge port 15d opened at the bottom of the chip pickup case 15 is closed with the lid 21, the dropped chips accumulate on the bottom of the chip pickup case 15.

The chips accumulating on the bottom of the chip pickup case 15 are collected when an operator makes rounds. More specifically, the operator opens the lid 21 closing the chip discharge port 15d against the pushing force of the return spring by swinging the operating lever 23 and collects the discharged chips together into the chip collection vessel 24.

Therefore, there is no need to attach the chip collection vessels 24 to all the chip pickup cases 15 in advance, reducing material cost correspondingly, and thus resulting in cost effectiveness. Also, since the chip discharge port 15d can be closed with the lid 21, the chips can be collected, for example, even while the electrode tips 4 and 5 are dressed, enabling efficient collection.

The lid 21 may not be closed using the pushing force of the return spring, but may be maintained in a closed state with a hook. In this case, when the hook can be released with a single motion, the efficiency of collecting work can be further improved.

Figure 3:
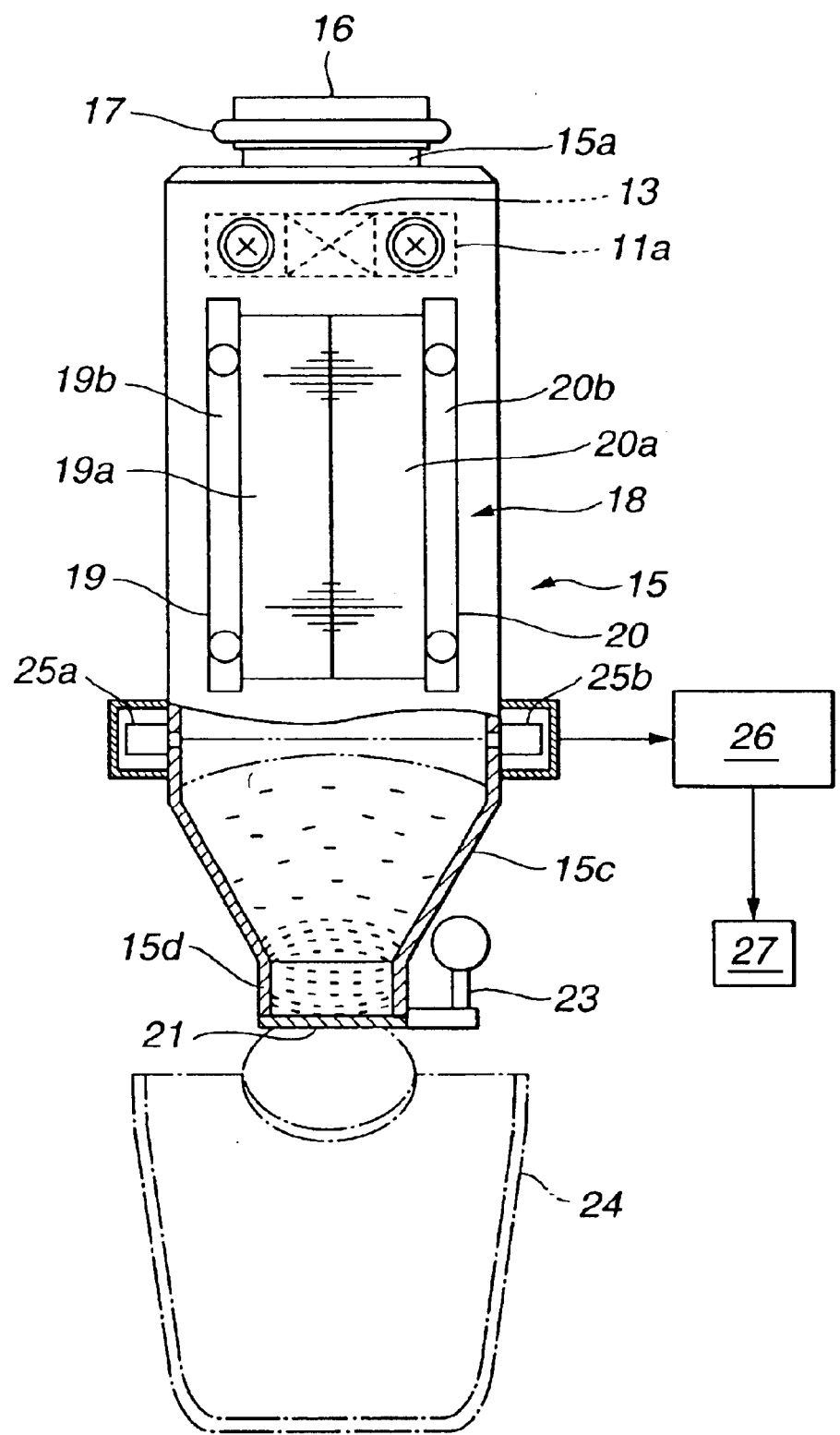
FIG. 3 is a partly sectional front view of a chip collecting apparatus for a tip dresser according to a second embodiment.

FIG. 3 shows a partly sectional front view of a chip collecting apparatus for a tip dresser according to a second embodiment of the present invention.

This embodiment includes a level meter determining if the amount of chips accumulating in the chip pickup case 15 reaches a set level. This embodiment adopts a pair of opposite phototubes 25a and 25b as a level meter, which are arranged to face each other at highest positions of the chip pickup case 15.

When the period of time over which the chips dropping and accumulating between the phototubes 25a and 25b block irradiation light between the phototubes 25a and 25b is more than a set time t, an operating circuit 26 determines that the volume of the chips reaches an upper limit, and urges an operator to collect the chips by outputting a driving signal to a warning device 27 such as a lamp and a beeper to light on the lamp or sound a beep as a warning.

The set time t, which is obtained by experiment and so on in advance, is set longer than a period of time required for dressing operation to prevent erroneous determination due to the chips during dressing operation. The phototubes 25a and 25b may be replaced with a photosensor formed of a light-emitting device and a photoreceptor device.

Figure 4:
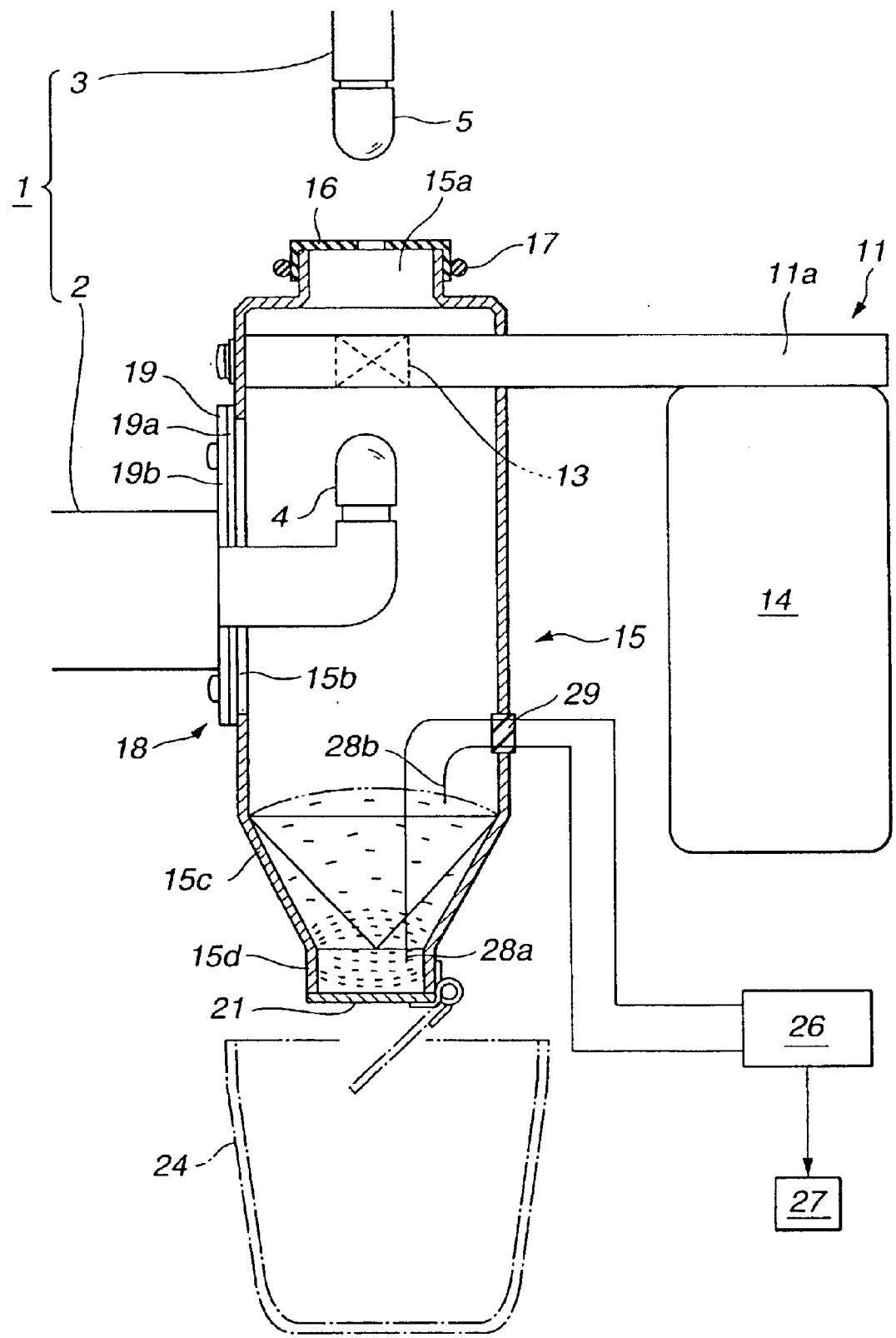
FIG. 4 is a sectional side view of a chip collecting apparatus for a tip dresser according to a third embodiment.

FIG. 4 shows a sectional side view of a chip collecting apparatus for a tip dresser according to a third embodiment of the invention.

In this embodiment, a pair of first and second electrodes 28a and 28b is adopted as a level meter for determining if the amount of chips accumulating in the chip pickup case 15 reaches a set level.

The first and second electrodes 28a and 28b are inserted into the chip pickup case 15 through a bushing 29, the first electrode 28a being arranged on the chip discharge port 15d side and the second electrode 28b being arranged at a position of the highest level. The chips generated while the electrode tips 4 and 5 are dressed have conductivity. Accordingly, when the amount of chips accumulating at the chip discharge port 15d reaches the upper limit level and the chips are brought into contact with the second electrode 28b, the first and second electrodes 28a and 28b are electrically conducted. The operating circuit 26 senses it, and urges an operator to collect the chips by outputting a driving signal to the warning device 27 such as a lamp and a beeper to light on the lamp or sound a beep as a warning.

The level meter may be a pressure-sensing switch sensing the weight of the accumulated chips and may be disposed on the top of the lid 21. In this case, when the weight of the accumulated chips exceeds a predetermined value, the operator is notified of the time of collecting chips.

It is also possible that the dresser main body 11a is disposed such that the cutters provided at both sides of the dressing body 13 are arranged horizontally, and the chip pickup case 15 is formed in a shape in which the electrode tips 4 and 5 can be positioned to face the cutters horizontally.

Furthermore, in the second and third embodiments, when the warning device 27 provided to one chip collecting apparatus for a tip dresser issues an alarm, the chips accumulating in the chip pickup cases 15 mounted on all the tip dressers 11 may be collected.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

According to the present invention, as described above, the collection rate of the chips generating while the electrode tips are dressed by polishing or grinding operation can be increased and the rate of recycling can be improved. Moreover, there is no need to individually provide the chip collection vessel, producing great effect of reducing material cost correspondingly, and improving the efficiency of chip collection work.

What is claimed is:

1. A chip collecting apparatus for a tip dresser, comprising:

a dresser main body for dressing electrode tips by sandwiching and pressurizing both sides of a dressing body in the dresser main body with a pair of opposite electrode tips and relatively sliding the dressing body and the pair of electrode tips;

a chip discharge port provided at the lower part of a chip pickup case covering the dressing body held in the dresser main body; and a lid for openably closing the chip discharge port, wherein the chip pickup case includes a level meter, which is made up of a pair of phototubes, therein for determining when the amount of accumulated chips reaches a set level.

2. A chip collecting apparatus for a tip dresser, comprising:

a dresser main body for dressing electrode tips by sandwiching and pressurizing both sides of a dressing body in the dresser main body with a pair of opposite electrode tips and relatively sliding the dressing body and the pair of electrode tips;

a chip discharge port provided at the lower part of a chip pickup case covering the dressing body held in the dresser main body; and a lid for openably closing the chip discharge port, wherein the chip pickup case includes a level meter, which is made up of a photo sensor, therein for determining when the amount of accumulated chips reaches a set level.

3. A chip collecting apparatus for a tip dresser, comprising:

a dresser main body for dressing electrode tips by sandwiching and pressurizing both sides of a dressing body in the dresser main body with a pair of opposite electrode tips and relatively sliding the dressing body and the pair of electrode tips;

a chip discharge port provided at the lower part of a chip pickup case covering the dressing body held in the dresser main body; and a lid for openably closing the chip discharge port, wherein the chip pickup case includes a level meter, which is made up of a pair of electrodes, therein for determining when the amount of accumulated chips reaches a set level.

* * * * *